United States Patent [19]

Willing

[11] 4,248,751

[45] Feb. 3, 1981

[54] PROCESS FOR PRODUCING A SILICONE ELASTOMER EMULSION AND USE THEREOF

[75] Inventor: David N. Willing, Midland, Mich.

[73] Assignee: Dow Corning Corporation, Midland, Mich.

[21] Appl. No.: 71,459

[22] Filed: Aug. 31, 1979

[51] Int. Cl.³ .............................................. C08J 3/00
[52] U.S. Cl. ............................. 260/29.2 M; 528/15; 528/31; 528/32; 427/387; 427/374.1; 428/447; 428/452
[58] Field of Search ................. 427/374 R, 387; 428/447, 452; 260/29.2 M; 528/15, 31, 32

[56] References Cited

U.S. PATENT DOCUMENTS

| | | | |
|---|---|---|---|
| 2,595,928 | 5/1952 | Currie et al. | 252/358 |
| 2,891,920 | 6/1959 | Hyde et al. | 260/29.2 |
| 3,098,833 | 7/1963 | Soloman | 260/18 |
| 3,294,725 | 12/1966 | Findlay et al. | 260/29.2 |
| 3,355,406 | 11/1967 | Cekeda | 260/29.2 |
| 3,445,415 | 5/1969 | Cekeda, Jr. et al. | 260/29.6 |
| 3,445,420 | 5/1969 | Kookootsedes et al. | 260/37 |
| 3,706,695 | 12/1972 | Huebner et al. | 117/226 |
| 3,900,617 | 8/1975 | Grenoble | 427/387 |

FOREIGN PATENT DOCUMENTS

981824 1/1965 United Kingdom .
1541801 3/1979 United Kingdom .

OTHER PUBLICATIONS

Chemical Abstracts, vol. 83, 1975, p. 148, 81560 w, abstract of Japanese Kokai 75-35,225.

*Primary Examiner*—Melvyn I. Marquis
*Attorney, Agent, or Firm*—Roger H. Borrousch

[57] ABSTRACT

A latex of crosslinked silicone is prepared by emulsifying a vinyl endblocked polydiorganosiloxane and an organosilicon compound having silicon-bonded hydrogen atoms with water and surfactant, adding a platinum catalyst and then heating the emulsion to form the latex. Colloidal silica can be added to the latex to provide a product which is tougher. The water in the latex can be evaporated to provide an elastomer film. Coating the latex on a substrate, such as a textile or paper, provides an elastomeric coated substrate, which provides water repellency, insulation and release properties to the substrate.

15 Claims, No Drawings

PROCESS FOR PRODUCING A SILICONE ELASTOMER EMULSION AND USE THEREOF

BACKGROUND OF THE INVENTION

1. Field of the Invention

This invention relates to a process for producing a silicone latex.

2. Description of Art

Silicone latex as a general class of material is known, but has not been widely used. Various emulsions of silicone polymers, such as polydiorganosiloxanes, are known and are commercial products. An emulsion containing methylpolysiloxane and silica as an antifoam agent was described by Currie as early as 1952 in U.S. Pat. No. 2,595,928. Other emulsions of siloxanes are described by Findlay and Weyenberg in U.S. Pat. No. 3,294,725 and Hyde et al. in U.S. Pat. No. 2,891,920.

In U.S. Pat. No. 3,098,833, a process for preparing a catalyzed organopolysiloxane emulsion is described. The organopolysiloxane is defined as containing hydrogen atoms and/or hydroxyl radicals. This emulsion is defined as useful for a treating bath for cellulosic materials to make them water repellent. The shelf-life of these catalyzed aqueous organopolysiloxane emulsions is defined as in the order of more than 4 to 5 days.

U.S. Pat. No. 3,355,406 described silicone rubber latexes reinforced with silsesquioxanes. These latexes are made by making a colloidal suspension of a hydroxyl containing linear siloxane polymer, then adding the colloidal silsesquioxane, and optionally crosslinker and catalyst. These latexes are defined as stable upon standing but when applied to a substrate and the water evaporated, a film of silicone rubber or plastic is left behind.

U.S. Pat. No. 3,445,415 describes a method for making an organic latex adding organic monomer to a colloidal suspension containing a free radical catalyst, then polymerizing the organic monomer. The silsesquioxane serves as the site for the polymerization of the organic monomer.

The abstract of Japanese Kokai No. 75-35,225 in Chemical Abstracts, Volume 83, 1975, page 148, 81560w describes a composition comprising an organopolysiloxane emulsion, a hardener, and an aqueous emulsion containing organohydrodienepolysiloxane and diorganopolysiloxane with hydroxy end groups. This composition is described as being used to impregnate asbestos sheet base gaskets.

U.S. Pat. No. 3,706,695 describes a silicone emulsion prepared from hydroxyl containing polydiorganosiloxane, carbon black, a metallic salt of a carboxylic acid and an alkoxy silane of the formula $RSi(OR')_3$. The emulsion cures to a silicone rubber when the emulsion is used within periods of up to two weeks or more after preparation, but is not curable after long storage and requires regeneration by adding more alkoxysilane or organometallic catalyst or both.

From these references, it has been known prior to this application, that silicone latexes could be prepared from hydroxyl polydiorganosiloxane, alkoxysilanes or siloxanes containing silicon-bonded hydrogen atoms and a metallic salt of a carboxylic acid. These silicone latexes or emulsions are curable by removing the water at room temperature or by heating.

U.S. Pat. No. 3,445,420 describes a heat curable composition comprising a vinyl organosilicon polymer, an organosilicon compound containing SiH, a platinum catalyst and an acetylenic compound. These compositions are described as stable at low temperatures and curable by heating. These curable compositions can be dispersed in a volatile diluent including organic solvents and water. This patent teaches that water can be used as the diluent under conditions where there is little hydrolysis of the SiH bonds. This patent also teaches that the volatile diluent shows a strong inhibition to cure but that cure will occur when the diluent is evaporated.

In U.S. Pat. No. 3,900,617, there is described an aqueous emulsion treating bath which comprises a vinyl chain-stopped polyorganosiloxane, an organic hydrogen polysiloxane and a platinum catalyst. This patent describes the water as acting as an inhibitor for the platinum catalyzed vinyl/SiH reaction. For storage purposes, this patent states that it is best to prepare two separate emulsions, keeping the organohydrogenpolysiloxane component and the platinum catalyst separated.

SUMMARY OF THE INVENTION

This invention relates to a process for preparing a silicone elastomer emulsion by emulsifying in water and surfactant, a vinyl endblocked polydiorganosiloxane, an organosilicon compound having silicon-bonded hydrogen atoms, adding a platinum catalyst and heating the emulsion forming a latex of crosslinked silicone. Evaporating a deposit of this emulsion produces an elastomeric product, such as a film or coating. Such depositions can be used to coat substrates.

DESCRIPTION OF THE INVENTION

This invention relates to a process for producing a silicone elastomer emulsion comprising emulsifying (A) a vinyl endblocked polydiorganosiloxane, and (B) an organosilicon compound having silicon-bonded hydrogen atoms using water and surfactant to form an emulsion, adding a platinum catalyst, and heating the emulsion forming a latex of crosslinked silicone.

Production of a silicone latex in accordance with this invention can be accomplished by emulsifying polydiorganosiloxane (A) and organosilicon compound (B) in water and a surfactant. This emulsification can be accomplished in several ways. One method for emulsifying (A) and (B) is to mix (A) and (B) and then add water and surfactant and pass the resulting mixture through one of the well-known and commercially available homogenizer machines to form an emulsion. Another method for emulsifying (A) and (B) would be to start with an emulsion polymerized polydiorganosiloxane (A) and then add and mix organosilicon compounds (B) into the emulsion. Compound (B) could also be in emulsion form prior to mixing with (A). These emulsion polymerized polymers are known from U.S. Pat. No. 3,294,725 which is hereby incorporated by reference to show the method of emulsion polymerization and the resulting emulsion polymerized polymers. U.S. Pat. No. 3,294,725 is also incorporated to show the nonionic or anionic emulsifying agents or surfactants which can be used in the present invention. As used herein, the term "surfactant" will be any of those emulsifying agents useful to form aqueous silicone emulsions.

After the emulsion of (A) and (B) have been made, a platinum catalyst is added. Because the platinum catalyst can cause reaction between the water and compound (B) at room temperature, the emulsion after the addition of the platinum catalyst should not be stored for any extended periods of time and should be heated to form a latex of crosslinked silicone without delays which allow substantial reaction to occur. If, however, additional time is required between the time of the addition of the platinum catalyst and the heating step for crosslinking the emulsion to form the latex, an inhibitor for the platinum catalyst can be added. Such inhibitors are known, such as the acetylenic compounds defined in U.S. Pat. No. 3,445,420 which is hereby incorporated by reference. These inhibitors retard or inhibit the activity of the platinum catalyst, but allow the platinum catalyst to become active at elevated temperatures, such as above 70° C.

The platinum catalyzed emulsion is heated to form a crosslinked silicone latex. This heating step can vary substantially depending upon the quickness of crosslinking desired and the available heating means. Preferably the heating is at a temperature from 40° C. to 90° C. If a pressurized unit is used for heating the catalyzed emulsion, it may be possible to exceed 100° C., but such heating means are more expensive and may result in undesirable materials, such as separated products, and are thus not recommended. The emulsion should not be heated before the platinum catalyst is added unless it has been determined that an inhibitor added to the emulsion will not cause gellation of the emulsion.

The resulting latex of crosslinked silicone is similar to other latexes in appearances. It is a fluid material which can be pumped, spread and otherwise manipulated like other known latexes. One difference from other latexes is that the latex of this invention is made up of crosslinked particles dispersed in the aqueous phase. Conventional latexes which are designed to cure, are either precipitated from the aqueous phase and then cured or cure upon evaporation of the aqueous phase. The present platinum catalyzed emulsion of (A) and (B) would not remain stable over extended storage in the uncrosslinked state and still maintain its ability to form an elastomeric product upon evaporation of the water. The method described herein of forming crosslinked silicone particles in an aqueous phase provides a latex which maintains its ability to form an elastomeric product after extended storage of the latex because the crosslinking step has been accomplished in the emulsion state and further reaction between the vinyl groups in (A) and the silicon-bonded hydrogen atoms in (B) are not taking place during storage.

The latex obtained from (A) and (B) as defined above produces comparatively weak elastomeric films or coatings upon evaporation of the water. Such films are useful for impregnating fibrous materials or porous materials and for coating substrates, such as paper, metal and cloth wherein toughness is not required. To produce stronger films or coatings, a colloidal silica, preferably in the form of an aqueous dispersion of a colloidal silica, can be added to the crosslinked silicone latex after the heating step. The films or coatings obtained from evaporating the water from latexes which contain the colloidal silica are much stronger. The stronger films are more suited for use without a substrate and provide tougher coatings for substrates as well. The latexes can be applied to textiles, paper and other substrates to provide a coating upon evaporation of the aqueous phase which coating may be used to impart water repellant characteristics to substrates, release properties to substrates or insulating properties to substrates, such as heat and electrical insulation. The film or coating described above is not intended to be limited to a sheet-like configuration, but is intended to include impregnation wherein the coating or film may cover a thread, particle or fiber.

The evaporation is not limited to that evaporation resulting from unattended exposure of a deposit of latex to the atmosphere. Evaporation may additionally be assisted by a flow of dry air or other gas, either at ambient temperature or at an elevated temperature, by infrared heating or a combination of the various means. Care should be taken when accelerated means are used to evaporate the aqueous phase, that the rapidly leaving water vapor does not produce undesirable discontinuities in the film, if a continuous film or coating is desired.

The vinyl endblocked polydiorganosiloxane (A) can be any of the polydiorganosiloxanes endblocked with diorganovinylsiloxy units and can be represented by the formula

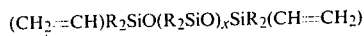

$$(CH_2=CH)R_2SiO(R_2SiO)_xSiR_2(CH=CH_2)$$

where each R is a monovalent hydrocarbon radical or a monovalent halogenated hydrocarbon radical and x is a representation of the number of repeating diorganosiloxane units in the polymer. The monovalent radicals can be any of those known to the art, but are preferably those with six carbon atoms or less. The preferred polydiorganosiloxanes are those wherein the monovalent organic radicals are methyl, ethyl, phenyl, 3,3,3-trifluoropropyl and mixtures thereof wherein at least 50 percent of the radicals are methyl radicals. The polydiorganosiloxane (A) can be a single type polymer with the same kind of repeating diorganosiloxane units or with a combination of two or more kinds of repeating diorganosiloxane units, such as combination of dimethylsiloxane units and methylphenylsiloxane units. (A) can also be a mixture of two or more polydiorganosiloxanes. The value of x should be at least large enough that a polydiorganosiloxane will have a viscosity of at least 0.1 Pa·s when measured at 25° C. The upper limit of polydiorganosiloxane (A), which is suitable for this invention, is limited only to the extent that it could not be dispersed to form a stable emulsion. Preferably, the value of x is such that viscosity would fall within a range of 0.1 to 100 Pa·s when measured at 25° C. The most preferred polydiorganosiloxanes, (A), have a viscosity of 0.3 to 10 Pa·s at 25° C.

The organosilicon compound (B) is one which contains silicon-bonded hydrogen atoms. (B) can be any compound or combination of compounds containing silicon-bonded hydrogen atoms useful as crosslinkers and providing an average of silicon-bonded hydrogen atoms per molecule of (B) of at least 2.1. Such organosilicon compounds are known in the art as illustrated in U.S. Pat. No. 3,697,473 which is hereby incorporated by reference. The preferred organosilicon compounds (B) are those which are siloxanes made up of units selected from $HSiO_{1.5}$, $R'HSiO$, $R'_2HSiO_{0.5}$, $R'SiO_{1.5}$, $R'_2SiO$, $R'_3SiO_{0.5}$ and $SiO_2$ such that there is at least 2.1 silicon-bonded hydrogen atoms per molecule. Each R' is preferably selected from an alkyl radical of 1 to 12 carbon atoms inclusive, phenyl and 3,3,3-trifluoropropyl. (B) can be either one compound or a mixture of compounds.

One preferred mixture of compounds to be used as (B) is described by U.S. Pat. No. 3,697,473 except as further defined herein. This mixture consists essentially of (1) an organosiloxane compound containing two silicon-bonded hydrogen atoms per molecule and the organic radicals being selected from the group defined above for R', no silicon atom having bonded thereto more than one silicon-bonded hydrogen atom, and said organosiloxane (1) having no more than 500 silicon atoms per molecule, and (2) an organosiloxane compound containing at least 3 silicon-bonded hydrogen atoms per molecule, the organic radicals being selected from the group defined above for R', no silicon atom having bonded thereto more than one silicon-bonded hydrogen atom and said organosiloxane compound (2) having no more than 75 silicon atoms per molecule. This mixture is such that at least 10 percent of the silicon-bonded hydrogen atoms are derived from (1) or (2) and the combination of (1) and (2) provides 100 weight percent of the mixture. This mixture is not limited to the use of organosiloxanes defined for (2) to 10 silicon-bonded hydrogen atoms per molecule as in U.S. Pat. No. 3,697,473, but can have as many silicon-bonded hydrogen atoms per molecule as there are silicon atoms per molecule.

The amount of (A) and (B) can vary broadly in weight amounts, because the unit of weight for each vinyl radical or silicon-bonded hydrogen atom will vary considerably. Such "units of weight" are determined by dividing the molecular weight by the number of vinyl radicals per molecule or number of SiH per molecule. Because the present invention involves the reaction between the vinyl radical of (A) and the silicon-bonded hydrogen atom SiH of (B), the amounts of (A) and (B) will depend upon the ratio of SiH to vinyl. The stoichiometry would suggest that about one SiH per vinyl is all that is needed, however, the reactivity of the SiH can vary significantly, as well as its availability for reaction can vary among the different compounds in (B) and even within a molecule of (B), there can be many different reactivities and availabilities. For this reason, the ratio of SiH to vinyl can vary beyond the stoichometric amounts and still provide products within the scope of this invention. The amount of (A) and (B) is preferably combined such that the ratio of SiH to vinyl can vary from 0.75/1 to 4/1, with the most preferred range of 0.75/1 to 1.5/1.

The platinum catalyst can be any of the platinum catalysts known to catalyze the addition of silicon-bonded hydrogen atoms to silicon-bonded vinyl radicals. Platinum catalysts can be any of the known forms, ranging from platinum as such or as deposited on carriers such as silica gel or powdered charcoal, to platinic chlorides, salts of platinum and chloroplatinic acid. The dispersibility of the platinum catalysts in the siloxane can be increased by complexing it with vinyl-containing siloxanes such as described in U.S. Pat. No. 3,419,593 which is hereby incorporated by reference. Additional platinum catalysts are defined in U.S. Pat. No. 3,697,473.

The amount of platinum catalyst used should be such that there is at least 0.1 part by weight platinum per one million parts by weight of the combined weight of (A) and (B). Preferably, the amount of catalyst used is from 1 to 20 parts by weight platinum per million parts by weight of (A) and (B). Larger amounts of platinum can be used if economic considerations are not important.

For those cases where a platinum catalyst inhibitor is desired, there are many types of known inhibitors. Because the present system is aqueous, the selection of an inhibitor should be one which does not have its effectiveness destroyed by water or surfactants or it does not destroy the emulsion. An effective inhibitor is the acetylenic alcohols which are described in U.S. Pat. No. 3,445,420 which is hereby incorporated by reference to show the acetylenic alcohols as well as other acetylenic compounds as inhibitors. Other platinum catalyst inhibitors are known as defined in U.S. Pat. No. 3,188,299, U.S. Pat. No. 3,188,300, U.S. Pat. No. 3,192,181, U.S. Pat. No. 3,344,111, U.S. Pat. No. 3,383,356, U.S. Pat. No. 3,453,233, U.S. Pat. No. 3,453,234 and U.S. Pat. No. 3,532,649.

Colloidal silicas which can be added to the crosslinked latex are well-known in the art. Many of these are available in an aqueous medium suitable for the direct addition to the latex. Although colloidal silica in the dry powdered state can be added and dispersed in the latexes prepared by the present process, it is preferred to use those already available in the aqueous medium. The amount of colloidal silica added can vary broadly depending upon the reinforcement and other properties desired. Silica can be added in amounts of up to 70 parts by weight silica for each 100 parts by weight of crosslinked (A) and (B). Other ingredients can be used, such as colorants.

The following examples is illustrative only and should not be construed as limiting the present invention which is properly delineated in the claims.

EXAMPLE

A siloxane mixture was prepared by combining 200 parts by weight of a methylphenylvinylsiloxy endblocked polydimethylsiloxane having a viscosity at 25° C. of 1.28 Pa·s and 0.0122 equivalents of vinyl per 100 grams, 20.8 parts by weight of a hydrogendimethylsiloxy endblocked polydimethylsiloxane having 0.09 weight percent silicon-bonded hydrogen, and 1.1 parts by weight of a polyorganosiloxane containing hydrogen-dimethylsiloxy units, dimethylsiloxane units and methylhydrogensiloxane units and having 0.66 weight percent silicon-bonded hydrogen atoms. This siloxane mixture had a ratio of SiH to vinyl of 1.06/1. An emulsion was prepared by combining 40 parts by weight of the siloxane mixture, 8 parts by weight of water and 4 parts by weight of a nonionic surfactant which was 90 weight percent trimethylnonylpolyethylene glycol ether and then using a commercial homogenizer to form a thick phase. To this thick phase 148 parts by weight of water was slowly added to form an emulsion. To 15 ml. of this emulsion, 3 drops of a solution of chloroplatinic acid in isopropanol where the solution was 0.1 molar in platinum was added. The emulsion was then heated at about 60° C. for 30 minutes by using a hot water bath in which the emulsion container was lowered for heating. The resulting latex was composed of crosslinked particles dispersed in an aqueous phase. A portion of this latex was spread on a surface and allowed to air dry at ambient temperature. A weak rubbery continuous film was formed after the aqueous phase evaporated.

To a five gram sample of the latex prepared above, 2.5 grams of a colloidal silica in an aqueous medium was added and mixed. The colloidal silica contained about 15 weight percent $SiO_2$, had a pH at 25° C. of about 8.5, the particle diameter of the silica was between 7 and 8 millimicrons and the surface area was between 350 and 400 $m^2/g$. A portion of this silica-containing latex was spread out and air dried at slightly above ambient temperature to produce a very tough rubbery material.

A sample of 50 grams of the emulsion prepared above was stirred while one drop of the platinum catalyst as defined above which had been further diluted to 10 drops with isopropanol was added. A gas fermentation tube was used to determine if any substantial gassing would occur by storing overnight. No gassing was observed indicating that storage of catalyzed emulsion for at least 16 hours was possible. About one half of this catalyzed emulsion was heated in a vial for 2.5 hours at temperatures ranging from 70° C. to 90° C. A latex which contained crosslinked particles was formed, upon air drying a deposition of a rubbery film was obtained. A gelled mass resulted when the emulsion was heated to 70° C. and then platinum catalyst was added. This showed that the addition of platinum catalyst to a heated emulsion can destroy the emulsion.

That which is claimed is:

1. A process for producing a silicone elastomer emulsion comprising emulsifying
   (A) a vinyl endblocked polydiorganosiloxane, and
   (B) an organosilicon compound having silicon-bonded hydrogen atoms using water and surfactant to form an emulsion, adding a platinum catalyst, and heating the emulsion forming a latex of crosslinked silicone.

2. A crosslinked silicone latex produced by the method of claim 1.

3. The process in accordance with claim 1 in which a colloidal silica is added to the latex of crosslinked silicone.

4. A crosslinked silicone latex produced by the method of claim 3.

5. The process in accordance with claim 1 in which the vinyl endblocked polydiorganosiloxane (A) is a polydiorganosiloxane terminated by triorganosiloxy groups and having two vinyl radicals per molecule, no silicon atom having more than one vinyl radical bonded thereto, the remaining organic radicals being selected from the group consisting of methyl, ethyl, phenyl and 3,3,3-trifluoropropyl radicals, at least 50 percent of the organic radicals being methyl radicals, and said polydiorganosiloxane having a viscosity of from 0.1 to 100 Pa·s at 25° C., and the organo-silicon compound (B) is a mixture of silicon compounds providing from 0.75 to 1.50 silicon-bonded hydrogen atoms per vinyl radical of (A), said mixture (B) consisting essentially of
   (1) an organosiloxane compound containing two silicon-bonded hydrogen atoms per molecule and the organic radicals being selected from the group consisting of alkyl radicals having from 1 to 12 carbon atoms inclusive, phenyl and 3,3,3-trifluoropropyl, no silicon atom having bonded thereto more than one silicon-bonded hydrogen atom, and said organosiloxane compound (1) having no more than 500 silicon atoms per molecule, and
   (2) an organosiloxane compound containing at least 3 silicon-bonded hydrogen atoms per molecule, the organic radicals being selected from the group consisting of alkyl radicals having from 1 to 12 carbon atoms inclusive, phenyl and 3,3,3-trifluoropropyl radicals, no silicon atom having bonded thereto more than one silicon-bonded hydrogen atom and said organosiloxane compound (2) having no more than 75 silicon atoms per molecule, said mixture (B) being such that at least 10 percent of the silicon-bonded hydrogen atoms are derived from (1) and at least 10 percent of the silicon-bonded hydrogen atoms are derived from (2), (1) and (2) composing 100 weight percent of mixture (B).

6. A crosslinked silicone latex produced by the method of claim 5.

7. The process in accordance with claim 5 in which a colloidal silica is added to the latex of crosslinked silicone.

8. A process in which a crosslinked silicone latex is produced in accordance with claim 1 and thereafter the water is evaporated from the crosslinked silicone latex to form an elastomeric film.

9. The process in accordance with claim 8 in which the latex is coated on a substrate before evaporating the water.

10. A process in which a crosslinked silicone latex is produced in accordance with claim 5 and thereafter the water is evaporated from the crosslinked silicone latex to form an elastomeric film.

11. The process in accordance with claim 10 in which the latex is coated on a substrate before evaporating the water.

12. A process in which a crosslinked silicone latex is produced in accordance with claim 7 and thereafter the water is evaporated from the crosslinked silicone latex to form an elastomeric film.

13. The process in accordance with claim 12 in which the latex is coated on a substrate before evaporating the water.

14. The process in accordance with claim 13 in which the substrate is a textile.

15. The process in accordance with claim 14 in which the substrate is paper.

* * * * *